June 16, 1925.  1,542,503

C. HAIDLE

MEAT HOOK

Filed Oct. 20, 1924

Inventor
Christian Haidle

By Herbert E. Smith
Attorney

Patented June 16, 1925.

1,542,503

UNITED STATES PATENT OFFICE.

CHRISTIAN HAIDLE, OF POST FALLS, IDAHO.

MEAT HOOK.

Application filed October 20, 1924. Serial No. 744,692.

*To all whom it may concern:*

Be it known that I, CHRISTIAN HAIDLE, a citizen of the United States, residing at Post Falls, in Kootenai County, and State of Idaho, have invented certain new and useful Improvements in Meat Hooks, of which the following is a specification.

My present invention relates to improvements in meat hooks, especially adapted for use in packing houses, butcher shops and other similar places. The primary object of my invention is the provision of a hand tool or implement for handling pieces of meat, or similar articles, as for instance in manipulating meats that are pickled in brine or other pickling fluids, where sanitary conditions are desirable and necessary. The implement is especially convenient in handling meats for transferring them from one receptacle to another for packing, storing, displaying or for analogous uses.

Means are provided in connection with the handle of the hook whereby the finger or thumb may be utilized to best advantage in gripping the implement and manipulating a weight or load as a piece of meat carried on the hook, as will hereinafter be more fully explained. In the accompanying drawings as illustrated therein the invention consists in certain novel combinations and arrangements of parts which will be specifically referred to and claimed. As an exemplification of my invention the parts are combined and arranged in accordance with the best mode I have thus far devised for the practical application of the principles of my invention.

Figure 1:
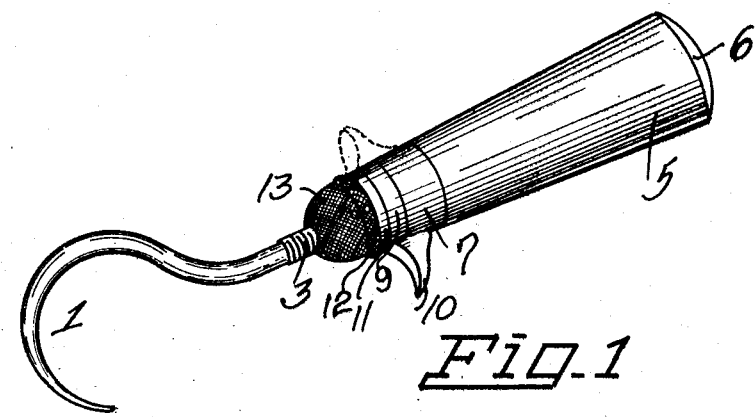
Figure 1 is a perspective view of a meat hook or hand implement of this type embodying my invention.

In the preferred form of my invention as shown in the drawings the hook 1 is bent or curved to shape with a pointed end, and provided with a straight shank 2 having a threaded portion 3 near the hook. The shank is formed with a head 4 and is passed through a handle 5 preferably of wood. The rear end of the handle is provided with a metallic cap 6 which is retained on the handle by means of the head of the shank, and said cap is rounded to form a hammer-head by means of which blows may be struck while the handle is grasped in the hand. In this manner the implement may be used as a hammer for nailing up boxes, crates, etc., or for bending down nails in the process of unpacking a box.

Figure 2:
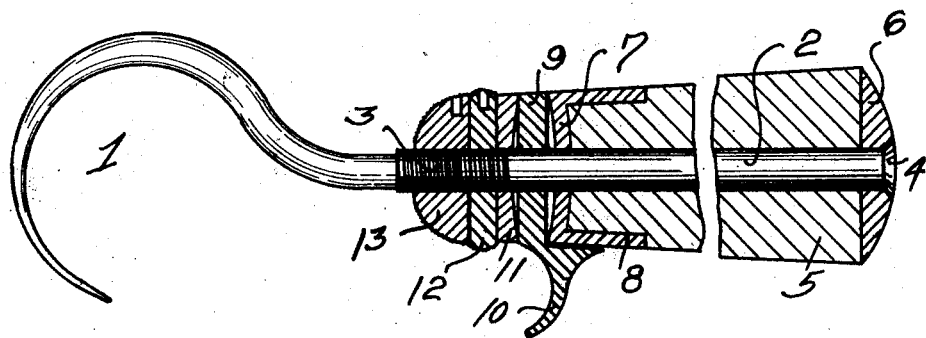
Figure 2 is an enlarged, sectional view through the handle (which is partly broken away for convenience of illustration) and connections thereon.

On the inner end of the handle, or the end opposite to the hammer-cap 6, a second handle cap 7 is provided which is fashioned with an annular flange 8 that encases the smaller end of the wood handle and performs the function of a ferrule on the handle. The handle and two caps 6 and 7 are perforated to accommodate the shank or stem 2 as indicated in Figure 2, and the shank also carries a disk or locking plate 9 which is perforated for the shank and is rotatably adjustable thereon and provided with means for fixing it with relation to the shank and handle. The locking plate is provided with an integral finger piece 10 fashioned in the form of a trigger, but rigid with the locking plate. The plate and its finger piece are rotatably adjustable on the shank and may be turned thereon with the finger piece in various positions with relation to the hook in order that the finger or thumb may be utilized in grasping the handle for various manipulations of the hook.

In Figures 1 and 2 of the drawings the finger piece is located in the same plane in which the bent hook is projected, but it will be apparent that when the locking plate is loosened the finger piece may be turned to other convenient positions for use, as indicated in dotted lines in Figure 1. By this turning the plate the finger piece may be positioned at various angles, selectively, to adapt the tool for manipulation by either left-hand or right-hand persons, or to relieve certain muscles of the hand from excessive use, and for convenience in handling the meats or other objects or articles.

The locking disk or plate with its finger piece is locked in position on the shank by means of a friction washer 11 on the shank and a nut 12 and locking nut 13, the latter elements being carried on the threaded portion 3 of the shank. It will be apparent that with the locking plate loose on the shank it may be turned to selected adjusted position, then by turning home the nut 12 against the friction washer 11 the latter is caused to frictionally engage the plate 9 and clamp it against the head 7 of the ferrule on the handle. To insure tight locking of the parts in adjusted position the knurled nut 13 is then turned home to lock the clamp nut 12.

As thus described the implement may be adapted for use and manipulation in various manners or modes and the tool may be used with facility in the performance of numerous functions.

Having thus fully described my invention what I claim as new and desire to secure by Letters Patent is—

1. The combination with a hook and its shank having a threaded portion and a handle on the shank, of a plate loose on the shank and a finger piece on said plate, and means for rigidly securing said plate in relation to the handle.

2. The combination with a hook and its shank and a handle thereon, of a locking plate carried on the shank between the handle and hook, a finger piece fixed on said plate, and means for clamping said plate in selected position with relation to said handle.

3. The combination with a hook and its threaded shank and a handle on the shank, of a locking plate having an integral finger piece and carried on the shank, and a nut on the threaded shank for rigidly securing said locking plate with relation to the hook.

In testimony whereof I affix my signature.

CHRISTIAN HAIDLE.